United States Patent [19]

Pryadkin et al.

[11] Patent Number: 4,591,435
[45] Date of Patent: May 27, 1986

[54] FILTER PRESS

[76] Inventors: Pavel P. Pryadkin, ulitsa Universitetskaya, 9, kv. 44; Leonid P. Pertsev, ulitsa Askharova, 9, kv. 27; Viktor S. Ziborov, ulitsa Geroev truda, 30, kv. 80; Alexandr F. Pichakhchi, ulitsa Pushkinskaya, 32, kv. 28; Alexandr A. Malyshkin, ulitsa Petrozavodskaya, 31/19, kv. 1; Vladislav N. Onufriev, ulitsa Tankopia, 35, kv. 84, all of Kharkov, U.S.S.R.

[21] Appl. No.: 648,160

[22] PCT Filed: Jun. 13, 1983

[86] PCT No.: PCT/SU83/00017
  § 371 Date: Aug. 22, 1984
  § 102(e) Date: Aug. 22, 1984

[87] PCT Pub. No.: WO84/02477
  PCT Pub. Date: Jul. 5, 1984

[30] Foreign Application Priority Data

Dec. 24, 1982 [SU] U.S.S.R. .............................. 3522052

[51] Int. Cl.⁴ .............................................. B01D 25/15
[52] U.S. Cl. .................................................... 210/230
[58] Field of Search ......................... 210/230, 227, 228

[56] References Cited

U.S. PATENT DOCUMENTS 1,498,313  6/1924  Ahlum ................................. 210/228

FOREIGN PATENT DOCUMENTS

| 704072 | 3/1941 | Fed. Rep. of Germany | 210/230 |
| 2707828 | 8/1978 | Fed. Rep. of Germany | . |
| 8025470 | 9/1980 | Fed. Rep. of Germany | . |
| 3128768 | 2/1983 | Fed. Rep. of Germany | 210/228 |
| 2347077 | 11/1977 | France | . |
| 54-2573 | 1/1979 | Japan | . |
| 576996 | 4/1946 | United Kingdom | 210/230 |
| 2040716 | 9/1980 | United Kingdom | 210/230 |
| 520112 | 7/1976 | U.S.S.R. | . |

*Primary Examiner*—Tim Miles
*Attorney, Agent, or Firm*—Fleit, Jacobson, Cohn & Price

[57] ABSTRACT

A filter press includes a frame mounted on posts, a thrust plate secured on the posts in mid-section of the frame, filter plate assemblies arranged on either side of the thrust plate, and a clamp for the filter plates assemblies. The clamp of the filter plate assemblies includes pressure plates, a drive, and braces. The braces of the clamp for the filter plate assemblies are movable both horizontally along the longitudinal centerline of the filter press and vertically relative to the longitudinal centerline. They are also pivotably connected by ends thereof to the drive and by the other ends to the pressure plates.

13 Claims, 10 Drawing Figures

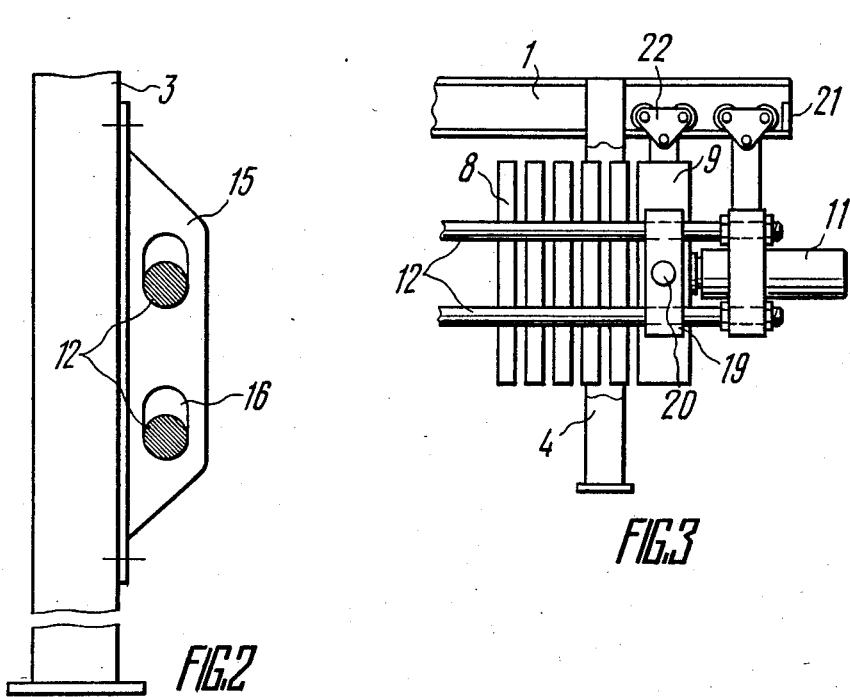

FILTER PRESS

FIELD OF THE INVENTION

This invention relates to the chemical engineering industry, more specifically to filter presses featuring large filtration surface areas.

BACKGROUND OF THE INVENTION

In view of the ever increasing production volumes in most industrial branches much attention is being devoted lately to environmental protection, the more stringent requirements being imposed upon separating from sewage water industrial waste products which include solid matter and dissolved harmful substances.

One important waste water purification process stage involves recovery of solid phase from suspension by filtration.

Vacuum filters and centrifuges are generally employed for filter-separation of easily filterable suspensions having a rather low hydraulic resistance. For filtering suspensions that are more difficult to filter, that is suspensions processing a rather high hydraulic resistance where use in normally made of filter presses.

Modern developments in the art of filter construction have taken special care to provide a larger filtering surface within one unit used in industrial fields where large bodies of suspensions have to be treated. This has been caused by the fact that the use of a multitude of small filtering surface filter presses result in excessive specific manufacturing and operating expenditures per unit area of the filtering surface. The expenditures thus encountered are accounted for by the fact that each small capacity filter press is to be equipped with independent automatic process control units, sets of valving fixtures, and other auxiliaries requiring numerous attending personnel.

It is to be noted that an increase in the filtering surface entails, due to employing a greater number of filter plates in the filter press, a problem associated with assuring a reliable hermetization of the filter plate assemblies.

However, no satisfactory solution to these problems has been found in the prior art filter press constructions.

Major demands placed on filter press constructions include the provision of high filtering capacity, as well as obtaining filter cakes of minimized moisture content and in some instances of minimal content of substances extractable from the cake inside the filter press.

There is known a filter press which includes a frame mounted on posts and accommodating an assembly of filter plates with a means for clamping or compressing these filter plates (cf., West German Application No. 2,707,828; published 1978).

The means for clamping the filter plate assembly includes a drive secured on the posts at one end of the frame, a thrust plate also arranged on the posts at the opposite end of the frame, a pressure plate, and braces. The filter plate assembly is interposed between the pressure and thrust plates.

The filter plates are connected therebetween and with the thrust and pressure plates by linkages providing for spacing all the plates at substantially equal distances, which enables to remove filter cake. The braces connect the thrust plate and the drive of the means for clamping the filter plate assembly.

In the course of clamping the filter plate assembly the drive of the clamping means acts on the pressure plate to compress the filter plates between the pressure and thrust plates. Therewith, the braces connecting the thrust plate and the drive of the means for clamping the filter plate assembly take up the compressive force to thereby assure hermeticity of the filter plate assembly.

For taking off the filter cake the means for clamping the filter plate assembly is engaged which acts to withdraw the pressure plate and space all the filter plates at equal distances, whereafter the cake is removed.

In the above filter press the movable member of the drive for clamping the filter plate assembly has a limited length determined by necessary strength characteristics. Therefore, the work stroke of the movable member of this means is limited by its size, which in turn leads to restrictions in the number of filter plates in the assembly, since the total length of spaces between the plates must not be in excess of the stroke length of the movable member of the drive.

There is also known a filter press comprising a frame mounted on posts and accommodating an assembly of filter plates, and a means for clamping the filter plates (cf., West German Utility Model No. 8,025,470; priority of Sept. 23, 1980).

The means for clamping the assemblies of filter plates in this press filter comprises a thrust plate secured on the posts at one end of the frame, a drive of the means for clamping the filter plate assemblies, a pressure plate disposed therebetween, and braces in the form of substantially flat beams arranged on the sides of the filter press in parallel with its longitudinal centerline and affixed by ends to the frame posts occupying the opposite end of the frame. The drive of the means for clamping the filter plate assembly is disposed on the frame for displacement along said braces and provided with retractable pins. When retracted, these pins cooperate with the braces by introducing them into holes made in the brace structure for fixing and thrusting the drive for clamping the filter plate assembly prepared for clamping.

For effecting reciprocating movement of the drive for clamping the filter plate assemblies it is provided with rollers and connected to a drive imparting movement thereto along the braces.

In order to assure hermeticity of the filter plate assembly, the drive for clamping the filter plates and the pressure plate are displaced toward the filter plate assembly, the position of the drive being fixed in the immediate proximity to the assembly by means of the retractable pins and holes made in the braces. Thereafter, the drive for clamping is actuated for the movable member thereof to compress the filter plate assembly and assure its hermeticity. The retractable pins provide for the thrust of the housing of the drive in the holes of the braces.

After terminating the filtration process the drive for clamping the filter plate assembly is disengaged, the retractable pins are withdrawn from the holes in the braces, and the drive for clamping the filter plate assembly together with the pressure plate is drawn away from the assembly by means of the longitudinal movement drive. Then the filter cake is removed from the filter press.

However, in the course of operation of the above filter press it becomes necessary to replace the filter cloth the thickness of which for various types of suspensions may vary within a wide range. This may cause substantial variations in the overall length of the filter plates (between 100 and 300 mm). Because the holes in the braces serving for driving thereinto the pins of the drive are made in strictly predetermined locations, and the fixation of the drive is possible only in these holes, then for fixing the drive in a working position in some instances it is necessary to remove 2 to 4 filter plates, which affects the efficiency of the filter press.

In addition, it also has to be noted that it is not always possible to increase the filtering surface of such a filter press by merely increasing the number of filter plates, since reliable hermeticity of the filter plate assembly, due to deformations arising therein in the course of compression, is assured when no less than 70 to 80 filter plates are available.

These deformations are developed as a consequence of lumps of filter cake tending to adhere to the lower portion of the filter plates during cake take off, as well as due to flaws in the manufacture of the filter plates and their seals.

There is further known a filter press which bears the closest resemblance to the filter press of the present invention. This prior art filter press comprises a frame mounted on posts, a thrust plate secured on the posts of the mid-section of the frame, assemblies of filter plates disposed on either side of the thrust plate, and a means for clamping the assemblies of the filter plates includes pressure plates, a drive, and braces by means of which the drive acts on the pressure plates (cf., Japanese Application No. 54-2573, published Jan. 10, 1979).

In this filter press the braces arranged in line with the axis of the filter press on either side thereof secured on the posts of the frame make up up an integral part therewith. The filter plate assemblies are installed on the braces to be capable of longitudinal displacement. In addition, two drives are provided in the above filter press for clamping the filter plate assemblies.

Thanks to the above arrangement of the filter press, the filtering surface is increased doublefold with the result that the specific capacity of the filter press per unit floor area occupied is enhanced whereas the capital outlays and operating costs per unit area of the filtering surface are reduced.

However, because each assembly of the filter plates may contain a definite number of such plates (70 to 80 plates), a further increase in the filtering surface through placing more filter plates is impossible due to deformation taking place during their compression caused by the lumps of filter cake tending to adhere to the lower portion of the filter plates, as well as due to the rigid connection between the drive for clamping the filter plate assemblies and the frame braces.

In addition, for ensuring a reliable operation of the above filter press it is necessary that the two drives of the means for clamping the filter plate assemblies operate synchronously, otherwise the thrust plate has to be much too bulky, which increases the amount of metal required for making the filter press. It is also to be noted that inherent in the aforedescribed filter press construction is a rather overcomplicated system of controlling the synchronous operation of the drives, and excessive specific metal consumption per unit area of the filtering surface resulting in increased capital outlays and operating costs.

Further, mounting of the filter plates directly on the frame braces prevents using in this filter press of known means for automatically taking off the filter cake, which in turn results in greater time and labour expenditures to remove the filter cake. This is disadvantageous, since it affects the specific capacity of the press filter in general.

SUMMARY OF THE INVENTION

The present invention is directed toward the provision of a filter press having such a construction as to enable through a certain arrangement of a means for clamping assemblies of filter plates and through interaction of its elements to attain an increase in the filtering surface and assure reliable hermeticity of the filter plate assemblies accompanied by a reduction in the capital outlays and operating costs.

The aim of the invention is attained by that in a filter press comprising a frame mounted on posts, a thrust plate secured on the posts in the mid-section of the frame, filter plate assemblies arranged on either side of the thrust plate, and a means for clamping the filter plate assemblies which includes pressure plates, a drive, and braces for the drive to act on the pressure plates, according to the invention, the braces of the means for clamping the assemblies of the filter plates are movable both horizontally along the longitudinal centerline of the filter press and vertically relative to the centerline, and further connected pivotably by ends thereof to the drive of the means for clamping the filter plate assemblies and by other ends to the pressure plate hinge pins which are retractable.

Thanks to the above arrangement of the filter press the filtering surface area is maximized, since the number of filter plates may reach as much as 150 to 180 pcs in each of the assemblies. Therewith, deformation of the filter plate assemblies arising as a result of the lumps of filter cake tending to adhere to the lower portion of the filter plates will fail to cause insufficient hermeticity of the filter plate assemblies.

This advantageous feature is accounted for by the ability of the pressure plates to self-align due to their pivotable connection to the braces of the means for clamping the filter plate assemblies. Therefore, the loads imparted by the pressure plates through the means for clamping the filter plate assemblies to these assemblies is distributed uniformly about the entire perimeter of the filter plates.

One more feature of the proposed filter press includes the provision in the mid-section of the frame of support plates having eyes adapted to receive for free displacement therein the braces of the means for clamping the filter plate assemblies, whereby a more reliable hermeticity of the filter plate assemblies is assured subsequent to their compression, this feature also preventing deformation of the braces of the means for clamping the filter plate assemblies when filter cake is taken off.

Preferably, each brace of the means for clamping the filter plate assemblies is made up of two tie rods connected by their ends therebetween by means of transverse members, whereby the amount of metal consumed for the manufacture of the braces and the filter press in general is reduced, these braces being further much easier to fabricate.

Advisably, for filtering a finely dispersed suspension the transverse member of one end of each brace cooperates with the hinge pin of the pressure plate in its extreme extended position, whereas the transverse member of the other end of the brace cooperates with a hinge pin of the drive for clamping the filter plate assemblies. This simplifies the filter press structurally and makes the filter press easier to assemble.

For increasing the service life of the proposed filter press, each brace is preferably additionally provided with a movable transverse member pivotably connected to the pressure plate cooperating directly with the drive for clamping the filter plate assemblies.

This construction is especially important for filtering suspensions containing a coarse-dispersion solid phase, since in this case a substantial deformation of the filter plate assemblies may occur, and, consequently, the movable member of the drive for clamping the filter plate assemblies may be susceptible to displacement relative to its stationary portion, which in turn may result in a premature wear of the drive.

BRIEF DESCRIPTION OF THE DRAWINGS

FIG. 2 is a view of a post 3 taken along the arrow "A" in FIG. 1.

FIG. 3 is a modified form of a means for clamping filter plate assemblies according to the invention;

BEST MODE FOR CARRYING OUT THE INVENTION

Figure 1:
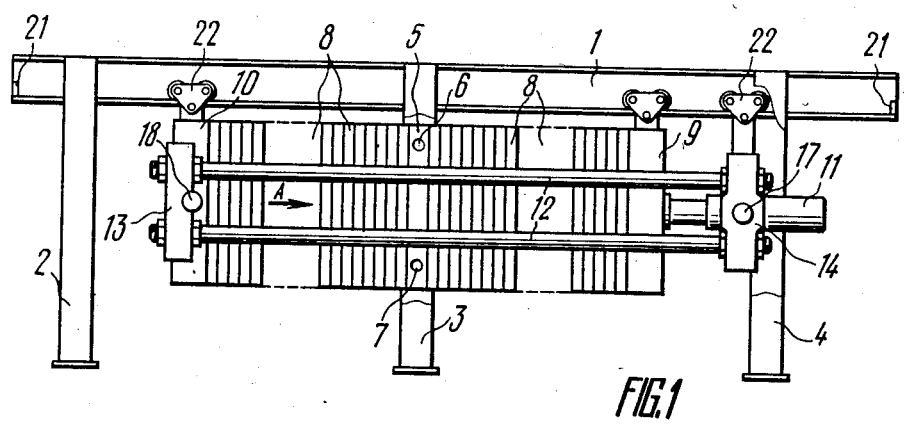
FIG. 1 is a side view of a filter press according to the invention.

The proposed filter press comprises a frame 1 (FIG. 1) mounted on posts 2, 3 and 4. The posts 3 in the mid-section of the frame carry a thrust plate 5 provided with passages 6 for feeding a suspension to be separated to the filter press, and a passage 7 for withdrawing the used fluid or filtrate.

Arranged on either side of the thrust plate 5 are assemblies of filter plates 8. The filter press also includes a means for clamping the filter plates which comprises pressure plates 9 and 10, a drive 11, and braces 12 arranged lengthwise of the filter press on both sides thereof. Each brace 12 is made up of two tie rods interconnected by their ends by means of transverse members 13 and 14. In order to provide for free displacement of the braces 12 both horizontally along the longitudinal centerline of the filter press and vertically relative to this centerline, the mid-section posts 3 have support plates 15 (FIG. 2) with eyes 16 in which said tie rods of the braces 12 are placed; there are also provided hinges having pins 17 and 18 by means of which the braces 12 are connected by one end to the drive 11 of the means for clamping the filter plates 8, while by the other end to the pressure plate 10 the pins 18 of which are retractable.

The eyes 16 of the support plates 15 are fashioned so as to provide for movement of the tie rods of the braces 12 both horizontally in parallel with the longitudinal centerline of the filter press and vertically relative to this centerline. The support plates 15 may, alternatively, be fashioned in any known suitable manner satisfactory for the purpose.

The connection of one end of the braces 12 (FIG. 1) with the drive 11 of the means for clamping the filter plate assemblies 8 is effected through the hinge pin 17 and a respective hole made in the transverse member 14, whereas the other end of the braces 12 is connected to the pressure plate 10 on the side opposite to the drive 11 through the retractable hinge pin 18 of this pressure plate 10 having a socket of semicylindrical shape made in the transverse member 13.

In addition, the drive 11 of the means for clamping the filter plates 8 is connected pivotably to the pressure plate 9 disposed between the assembly of the filter plates 8 and the drive 11.

For a more reliable hermeticity of the filter plate assemblies 8 during filtering suspensions containing a coarse-dispersion phase, each tie rod 12 (FIG. 3) of the proposed filter press is additionally provided with a movable transverse member 19 pivotably connected to the pressure plate 9 by means of a hinge pin 20 cooperating directly with the drive 11 for the means for clamping the filter plate assemblies.

In the latter case the tie rods 12 may be rigidly connected to the housing of the drive 11 of the means for clamping the filter plate assemblies 8.

Stop elements 21 are provided for restricting the travel of the means for clamping the filter plates 8 and the pressure plates 9 and 10, this stop element 21 being affixed to the frame 1.

The pressure plates 9 and 10 are pivotably suspended on the frame 1 by means of carriages 22 having rollers.

The proposed filter press operates in the following manner.

Figure 4:
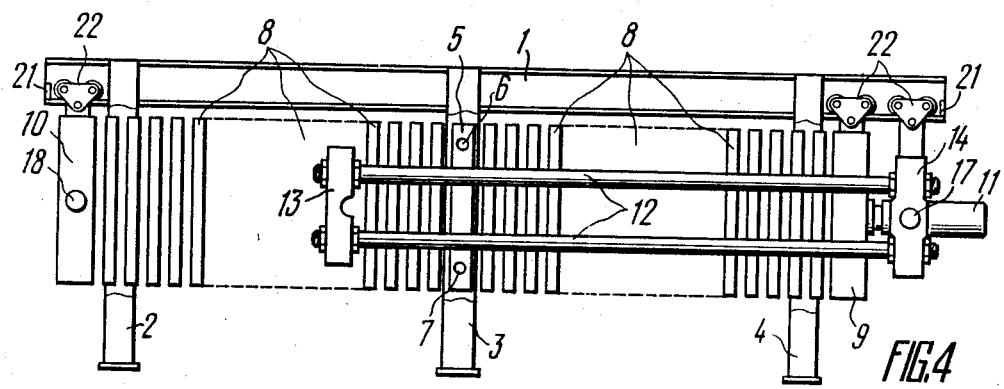
FIG. 4 illustrates substantially the same as shown in FIG. 1 with open filter plate assemblies.
Figure 5:
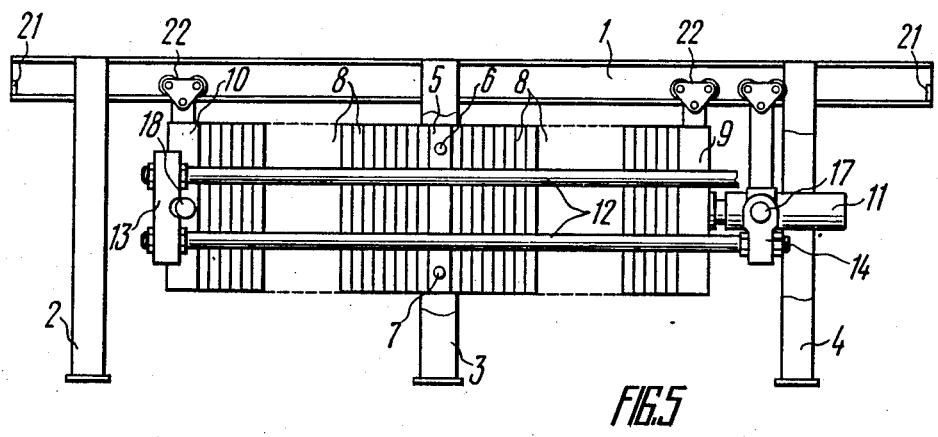
FIG. 5 is substantially the same as shown in FIG. 1 with filter plate assemblies prepared for clamping.

The filter plates 8 (FIG. 4) are moved by a known mechanism (not shown) and the pressure plates 9 and 10 toward the thrust plate 5 to thereby make filter plate assemblies. The drive 11 for the means for clamping the filter plate assemblies 8 is pivotally connected to said pressure plate 9 and is displaced together with the pressure plate 9 toward the thrust plate 5. Concurrently, the drive 11 acts to move the braces 12 pivotably connected thereto in substantially the same direction until they assume a position when the filter plates 8 (FIG. 1) are in contact with each other. In such a position of the braces 12 the filter plates 8 are in intimate contact thereby making filter plate assemblies prepared for compression.

In order to assure a tight clamping or compression of the filter plate assemblies 8, the hinge pins 18 are retracted from the pressure plate 10 to thereby provide for engagement between the pressure plate 10 and the transverse member 13 and for the filter plate assemblies 8 to be completely embraced on either side by the braces 12. Thereafter, the drive 11 of the means for clamping the filter plate assemblies 8 is actuated to compress these filter plate assemblies 8 (FIG. 1) and assure their hermetization. Subsequently, a suspension to be filtered is supplied under pressure through the passage 6, whereby the solid matter tends to build up in the form of cake in the filter chambers defined by the adjacent filter plates 8, and the liquid phase of the suspension (filtrate) is discharged through the passage 7.

When the suspension has been filtered, its delivery to the filter press is terminated.

If necessary, the filter cake may be washed by a liquid fed to the filter press via the passage 6 and discharged through the passage 7. For drying the cake air is supplied and discharged through the same passages 6 and 7, respectively.

The build up of cake is removed from the filter press. For this purpose the drive is reversed to move the pressure plate 9 away from the filter plate assemblies 8, whereby the pressure acting on these filter plates is relieved.

This is followed by opening the filter press. The retractable pins of the pressure plate 10 are brought out of engagement with the transverse members 13. Thereupon, by using a known mechanism (not shown) the pressure plates 9, 10 and the drive 11 of the means for clamping the filter plates 8 with the braces 12 are moved on the carriages 22 to the extreme position in contact with the stop elements 21. As a result, the filter plates 8 in each filter plate assembly are spaced apart for the cake to be taken off from the filter press.

Figure 6:
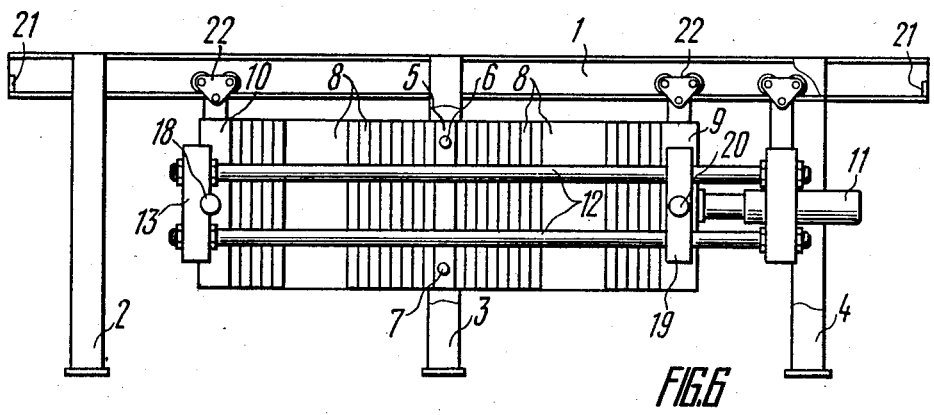
FIG. 6 is substantially the same as shown in FIG. 1 illustrating deformed filter plate assemblies.
Figure 7:
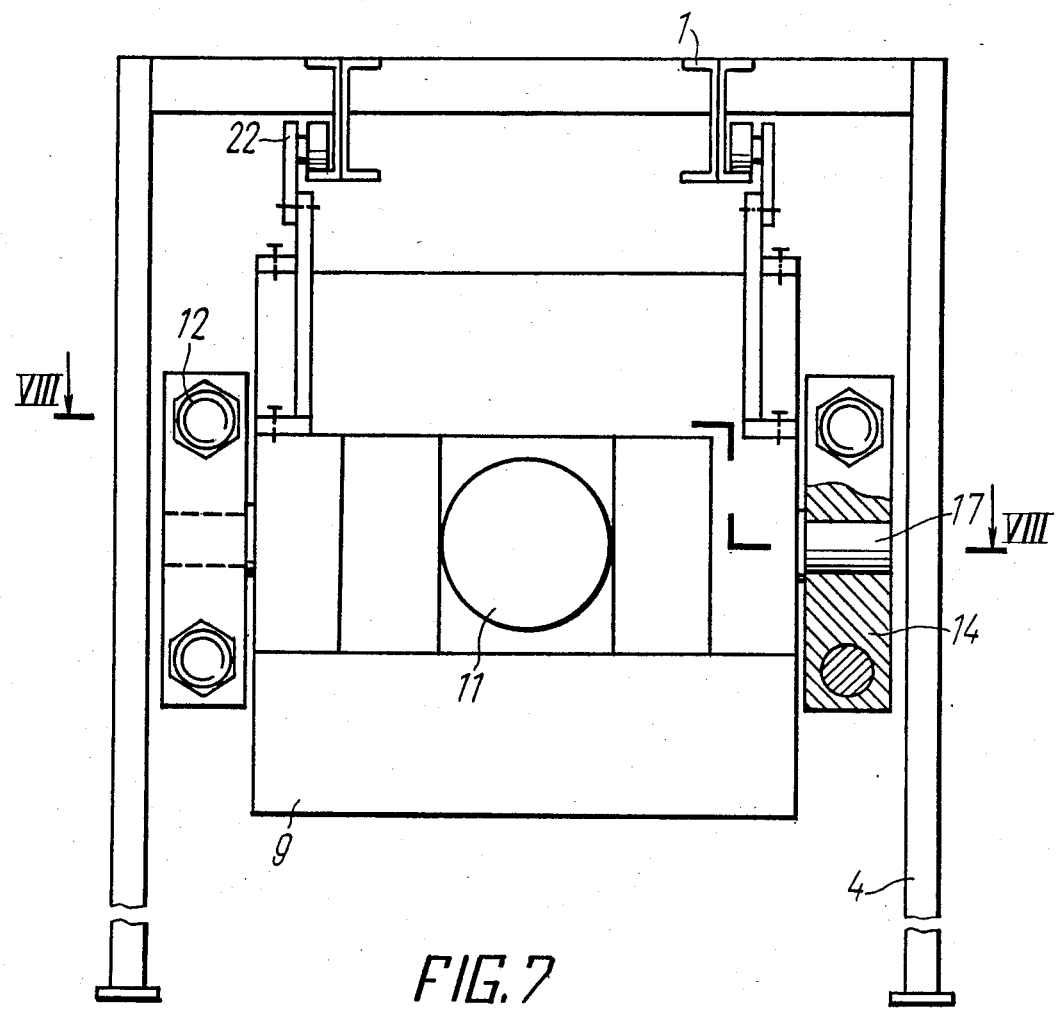
FIG. 7 illustrates an end face view of the filter press as seen from the drive of the means for clamping the assemblies of filter plates which is shown on an enlarged scale.
Figure 8:
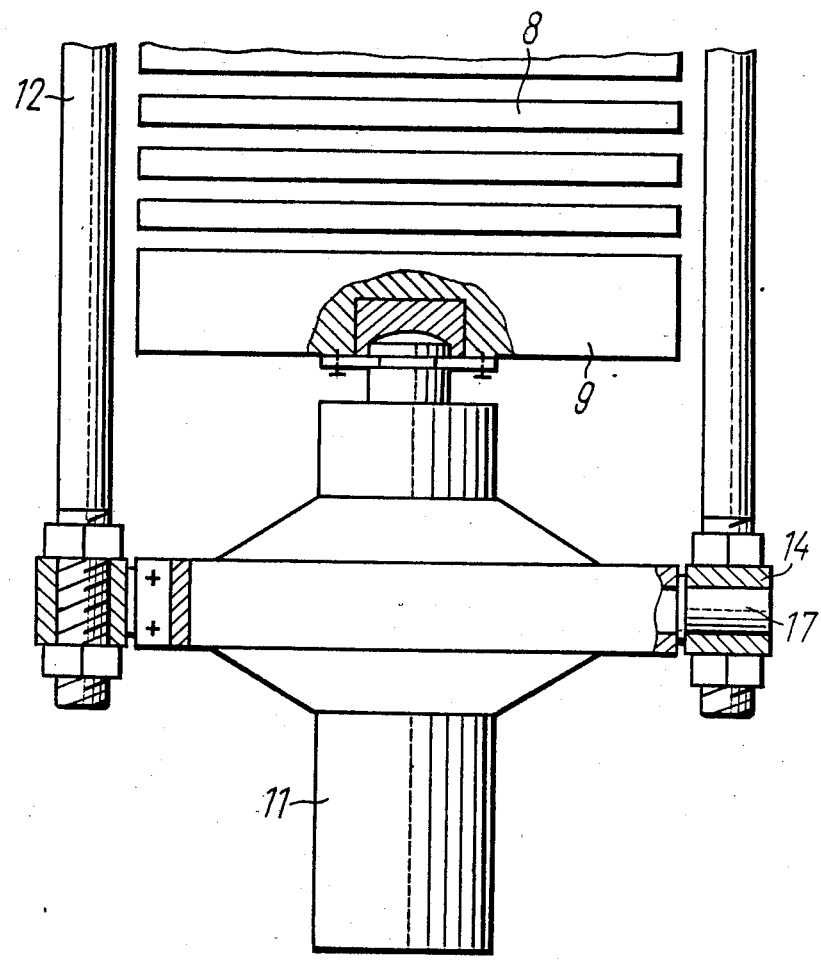
FIG. 8 illustrates a sectional view along the line VIII—VIII shown in FIG. 7 which is shown on an enlarged scale.
Figure 9:
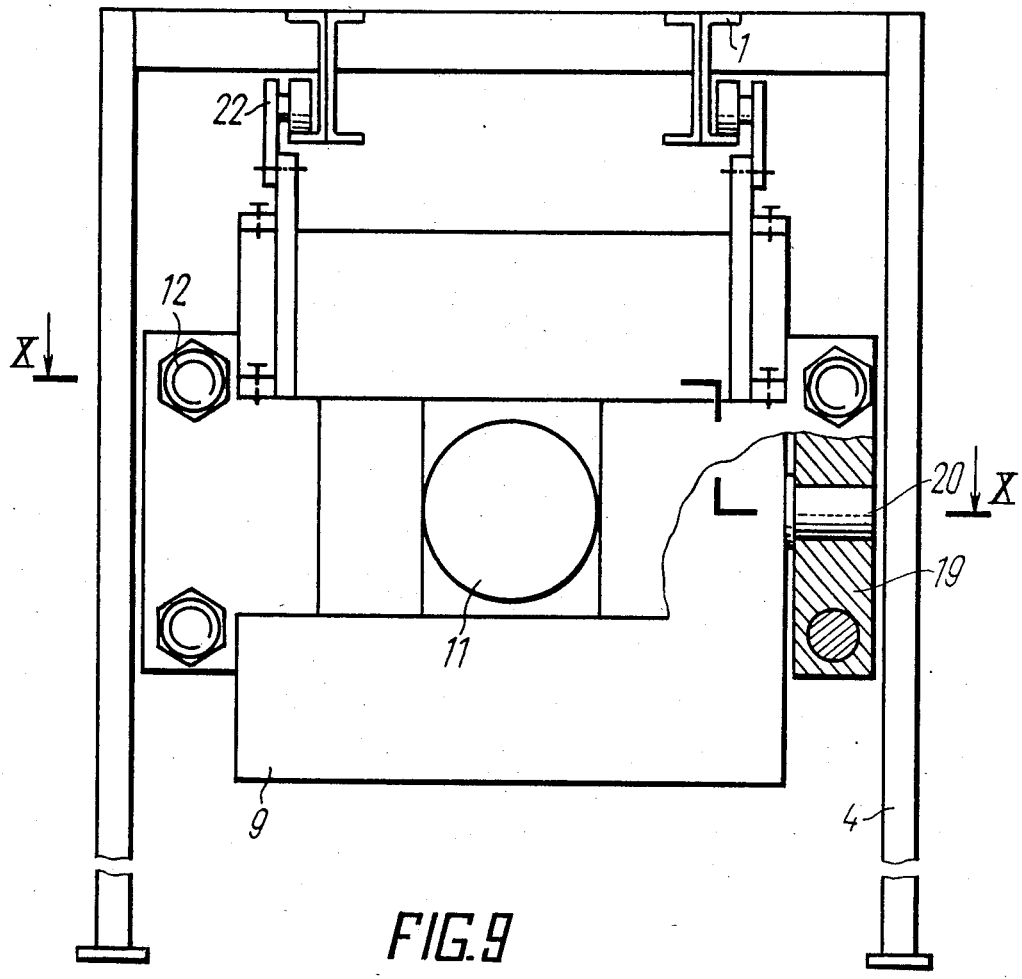
FIG. 9 illustrates an end face view of the filter press with means for clamping the assemblies of filter plates as shown in FIG. 3.
Figure 10:
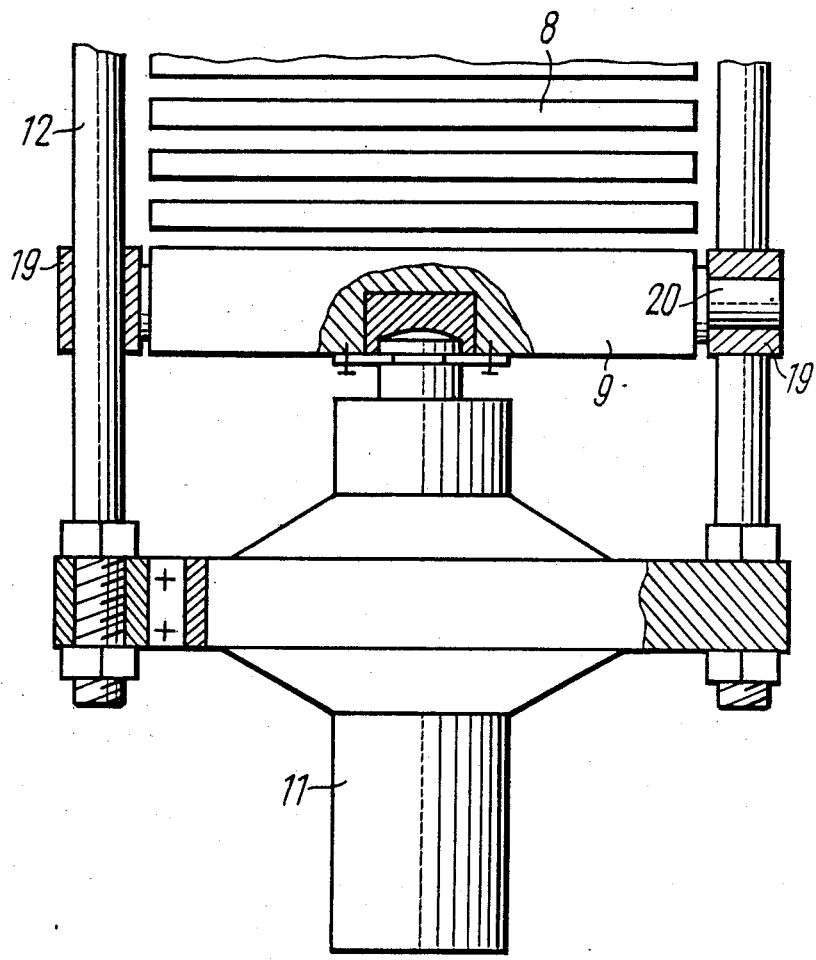
FIG. 10 illustrates a sectional view along the line X—X shown in FIG. 9 which is shown on an enlarged scale.

However, the removal of the cake is accompanied by the cake particles tending to stick to the lower parts of the filter plates. This in turn may cause deformation of the filter plate assemblies 8 when they are again compressed by the means for clamping the filter plates (FIG. 6) for the filtering process to recommence. Due to the aforesaid deformation the pressure plates 9 and 10 may assume a position somewhat inclined relative to the vertical axis of the filter press and be raised together with the braces 12 relative to their position prior to clamping of the filter plate assemblies. Nevertheless, such deformation would not cause a lack of hermeticity in the filter plate assemblies 8, since the braces 12 of the means for clamping the assemblies are adapted for both horizontal displacement relative to the longitudinal centerline of the filter press and vertical displacement relative to this centerline, and are further pivotably connected by their ends to the drive 11 for clamping the filter plate assemblies and by their other ends to the pressure plate 10. Thanks to the aforedescribed arrangement, the pressure plates 9 and 10 are capable of self-alignment relative to the deformed filter plate assemblies to provide for a uniform distribution of the compressive force about the entire perimeter of the filter plates 8.

During filtering suspensions containing a coarse-dispersion solid phase substantial deformation of the filter plate assemblies may take place to result in that the movable member of the drive 11 of the means for clamping the filter plates 8 may go askew to result in premature wear of the drive 11.

In order to prevent such possible skewness and assure a longer service life of the drive 11, the braces 12 are connected pivotably to the pressure plate 9 by means of the movable transverse member 19. Alternatively, the housing 1 may be rigidly connected to the braces 12.

Thanks to the above structural arrangement of the means for clamping the filter plate assemblies and the proposed filter press in general a substantial increase in its filtering surface is attained, reliable hermeticity of the filter plate assemblies is assured, per unit capacity thereof is increased, and production and operation costs are reduced.

INDUSTRIAL APPLICABILITY

The present invention can find advantageous application in the chemical, ore-beneficiation, coal, cement and other industries for separating suspensions into solid and liquid phases, as well as in processes associated with dewatering the sediments of sewage water.

We claim:

1. A filter press comprising:
   a frame mounted on posts,
   a thrust plate secured on the posts in a mid-section of the frame,
   filter plate assemblies arranged on either side of the thrust plate,
   clamping means for clamping the filter plate assemblies, said clamping means including pressure plates, a drive, and braces for the drive to act on the pressure plates,
   said braces being movable both horizontally along the longitudinal centerline of the filter press and vertically relative to said longitudinal centerline, and being pivotably connected by its ends to said drive and at its other ends to the pressure plate, and
   a retractable hinge pin means mounted on said pressure plate for connecting said other ends of said braces to said pressure plate.

2. A filter press according to claim 1, wherein the transverse member of one end of each brace cooperates with the hinge pin of the pressure plate in its extreme retracted position, whereas the transverse member of the other end of the brace cooperates with a hinge pin of the drive for clamping the filter plate assemblies.

3. A filter press according to claim 1, wherein the posts of the mid-section of the frame are provided with support plates having eyes adapted to receive for free displacement therein the braces.

4. A filter press according to claim 1, wherein each brace is made up of two tie rods connected by their ends therebetween by means of transverse members.

5. A filter press according to claim 4, wherein each brace is additionally provided with a movable transverse member connected to the pressure plate and cooperating directly with the drive for clamping the assemblies of filter plates.

6. A filter press comprising:
   a frame;
   at least three pairs of posts secured to said frame;
   a thrust plate for supplying a suspension to be separated by said filter press and for discharging a filtrate, said thrust plate being mounted on a middle pair of posts of said three pairs of posts;
   filter plate assemblies for separating the suspension being arranged on both sides of said thrust plate and suspended from said frame for movement along said frame;
   clamping means for clamping said filter plate assemblies;
   said clamping means including
      two pressure plates for clamping said filter plate assemblies and for defining filter chambers in said filter plate assemblies, said two pressure plates being suspended from said frame for movement along said frame and for embracing said filter plate assemblies, and
      drive means suspended from said frame adapted to move along said frame and being pivoted to one of said two pressure plates arranged in immediate proximity of said drive means;

a first pair of transverse members pivoted to said drive means;

a second pair of transverse members spaced from said first pair of transverse members and pivoted to one of said two pressure plates at the moment when said filter plates assemblies are clamped; and two pairs of braces positioned along said frame on both sides of said filter plate assemblies and secured at one end thereof in said first pair of transverse members, and secured at the other end thereof in said second pair of transverse members.

7. A filter press as claimed in claim 6, further comprising two hinge pins for pivotally connecting said second pair of transverse members to one of said pressure plates, said two hinge pins being mounted in said pressure plate to reciprocate toward said second pair of transverse members, and a semicylindrical recess defined by each transverse member of said second pair of transverse members and each semicylindrical recess being engaged by one of said two hinge pins.

8. A filter press as claimed in claim 7, further comprising two support plates secured to the middle pair of posts of said three pairs of posts and two eyes provided in each of said two support plates to be engaged by each of said two pair of braces.

9. A filter press as claimed in claim 8, wherein each of the pairs of braces is made up by two rods.

10. A filter press comprising:
a frame;
at least three pairs of posts secured to said frame;
a thrust plate for supplying a suspension to be separated by said filter press and for discharging the filtrate, said thrust plate being mounted on a middle pair of posts of said three pair of posts;
filter plate assemblies for separating the suspension being arranged on both sides of said thrust plate and suspended from said frame for movement along said frame;
means for clamping said filter plate assemblies;
said clamping means including two pressure plates for clamping said filter plate assemblies and for defining filter chambers in said filter plate assemblies, said two pressure plates being suspended from said frame for movement along said frame and for embracing said filter plate assemblies, and drive means suspended from said frame adapted to move along said frame and being pivoted to one of said two pressure plates arranged in immediate proximity of said drive means;

a first pair of transverse members rigidly connected with said drive means;

a second pair of transverse members spaced from said first pair of transverse members and pivoted to one of said two pressure plates at the moment when said filter plate assemblies are clamped;

a third pair of transverse members pivoted to the other of said two pressure plates; and two pairs of braces arranged along said frame on both sides of said filter plate assemblies, said two pairs of braces being secured at one end thereof in said second pair of transverse members, and at the other end, passing through said third pair of transverse members, and being secured in said first pair of transverse members.

11. A filter press as claimed in claim 10, further comprising two hinge pins for pivotally connecting said second pair of transverse members to one of said pressure plates, said two hinge pins being arranged in said pressure plate to reciprocate toward said second pair of transverse members, and a semicylindrical recess defined by each transverse member of said second pair of transverse members and each semicylindrical recess being engaged by one of said two hinge pins.

12. A filter press as claimed in claim 11, further comprising two support plates secured to the middle pair of posts of said three pairs of posts and two eyes provided in each of said two support plates to be engaged by each of said two pairs of braces.

13. A filter press as claimed in claim 12, wherein each of the pairs of braces is made up by two rods.

* * * * *